(12) United States Patent
Koopmans et al.

(10) Patent No.: US 12,363,133 B2
(45) Date of Patent: Jul. 15, 2025

(54) INTUITIVE COMPUTER SECURITY REPORT VISUALS

(71) Applicant: MICROSOFT TECHNOLOGY LICENSING, LLC, Redmond, WA (US)

(72) Inventors: Corissa Lea Koopmans, Addison, TX (US); Alexander T. Weinert, Seattle, WA (US); Richard B. Arthur, Bothell, WA (US); Brian Fabian, Bellevue, WA (US); Laxmi Bhavani Malkareddy, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 219 days.

(21) Appl. No.: 18/337,384

(22) Filed: Jun. 19, 2023

(65) Prior Publication Data

US 2024/0422173 A1 Dec. 19, 2024

(51) Int. Cl.
*H04L 9/40* (2022.01)
*H04L 43/045* (2022.01)
*H04L 43/067* (2022.01)

(52) U.S. Cl.
CPC ........ *H04L 63/1408* (2013.01); *H04L 43/045* (2013.01); *H04L 43/067* (2013.01)

(58) Field of Classification Search
CPC .. H04L 63/1408; H04L 43/045; H04L 43/067

USPC .......................................................... 726/22
See application file for complete search history.

(56) References Cited

U.S. PATENT DOCUMENTS 11,677,706 B1 * 6/2023 Chinnalagu ............ G06N 20/00
709/206

OTHER PUBLICATIONS

Jake Fowler, "Control Point Splines: Create Complex Sketch Curves with Precision and Ease", Jul. 20, 2018, 19 pages.

* cited by examiner

*Primary Examiner* — Lan Dai T Truong
(74) *Attorney, Agent, or Firm* — Newport IP, LLC; Jacob P. Rohwer

(57) ABSTRACT

The techniques disclosed herein enable systems to generate intuitive security reports that illustrate security events that occur during a predefined time period (e.g., thirty days). The security report visual can include a pair of parallel axes where the first axis includes a plurality of time-series segments respectively representing security event types (e.g., obfuscation, phishing) and the second axis includes two time-series segments representing security events that are not remediated and security events that are remediated. A plurality of first lines originating at respective points along the first axis and terminating within a GUI element can represent security events of various types that occur at a particular time unit (e.g., a day) within the predefined time period. A plurality of second lines originating within the GUI element and terminating at respective points along the second axis can represent security events that are either remediated or not remediated.

20 Claims, 9 Drawing Sheets

INTUITIVE COMPUTER SECURITY REPORT VISUALS

BACKGROUND

As the breadth and complexity of modern computer security systems continues to increase, there is a commensurate growth in demand for tools that enable users to gain insight into security operations and potential vulnerabilities. Moreover, computer security is of particular concern for business enterprises that provision internet-based services such as cloud computing platforms to expansive networks of client devices and user accounts. As business enterprises increase the volume of sensitive data and services that are accessible to users online, so does the potential for malicious activity. Moreover, such potential can increase dramatically as the number of users (e.g., customers, tenants) of an internet-based service grows.

Generally, these computer security tools can include a user interface that can collect and synthesize complex security data into statistics, reports, and visual aids that provide digestible insight on the security status of a computing environment such as a cloud computing system. In various examples, these security tools can be utilized by organizational leaders such as a chief security officer (CSO) who may lack the available time to perform complex analysis of security data. As such, the intuitiveness and clarity of the user interface can be a primary user experience concern for developers of computer security tools. It is with respect to these and other considerations that the disclosure herein is presented.

SUMMARY

The techniques disclosed herein enhance computer security tools and systems through an intuitive security report visual utilizing a pair of parallel time-series axes to display security events by type and outcome. As mentioned above, the quality of a user interface can dramatically affect the user experience of a computer security tool. This can be especially true for situations in which a user wishes to quickly assess the effectiveness of security policies without excessive complexity. In various examples, this and other use cases can be satisfied using a visual aid such as a graph, and accompanying statistics.

Unfortunately, many existing solutions may fail to strike a satisfactory balance between visual clarity and the ability to display relevant information. For example, some solutions may prioritize an intuitive visual design but sacrifice information density thereby requiring a user to spend additional time seeking out additional information and/or context. Alternatively, existing solutions may prioritize presenting relevant information at the expense of clarity and coherence resulting in unduly complex visuals leading to a degraded user experience. As many users of such security tools may be organizational leaders or other security professionals, a cumbersome user experience can lead to hampered computer security, undetected vulnerabilities, and other technical issues.

In contrast, the techniques discussed herein enable a computer security system to generate a security report visual that intuitively illustrates a plurality of security events (e.g., attacks) that occur in a predefined time period (e.g., thirty days) without compromising intuitiveness or information density. This is achieved through a first axis that comprises a plurality of time-series segments where each time-series segment is assigned an associated security event type (e.g., a valid account access type, a brute force type, a phishing type) and represents the predefined time period. In addition, the security report visual can include a second axis that is parallel to the first axis that comprises a first outcome time-series segment associated with a number of security events that are remediated during the predefined time period and a second outcome time-series segment associated with a number of security events that are not remediated during the predefined time period. In various examples, the first axis and the second axis can be optionally filtered by security event type and/or outcome. That is, a user can provide input to freely add and/or remove information from the security report visual according to need and/or personal preference.

Furthermore, the security report visual can include a graphical user interface (GUI) element that is positioned at a location between the first axis and the second axis. As will be discussed below, the second axis can be formatted such that the first outcome time-series segment and the second outcome time-series segment can illustrate a portion of the plurality of security events that are remediated and not remediated respectively. To visually reinforce these portions, the GUI element can be positioned relative to an intersection point between the first outcome time-series segment and the second outcome time-series segment. In this way, the security report visual can quickly communicate the effectiveness of a security policy and introduce an element of gamification to create an engaging user experience.

To populate the security report visual, a plurality of first lines can originate along the first axis and terminate within the GUI element. In various examples, a single first line of the plurality of first lines can originate at a point along the first axis that is within a type-specific time-series segment. Accordingly, the first line can represent a number of security events of a particular type that are detected during a certain time unit within a predefined time period. In a specific example, the predefined time period can be a month (e.g., thirty days) and a time unit can be one day. Moreover, the thickness of the first line can indicate the number of security events relative to other first lines of the plurality of first lines.

To further populate the security report visual, a plurality of second lines can originate from within the GUI element and terminate along the second axis. That is, a second line of the plurality of second lines can originate from within the GUI element and terminate at a point along the second axis corresponding to a particular time unit (e.g., a day). Unlike the first lines which can represent a number of security events of a particular type, a second line of the plurality of second lines can represent a number of security events that are either remediated or not remediated, regardless of type. Similar to the first lines, the thickness of a second line can indicate the number of security events, of multiple types, that are remediated or not remediated in relation to other second lines of the plurality of second lines.

By utilizing two parallel axes and constituent time-series segments for each axis, the security report graphic discussed herein can simultaneously present security data on a type-specific basis and outcome basis in a temporal context (e.g., within a thirty-day timespan) that is absent from existing solutions for generating a visual digest of security events. In this way, a user can quickly assess the performance of security policies within a computing environment and apprise themselves of potential security vulnerabilities. Consequently, the security report visual can improve the efficiency of computer security operations by reducing the time required to access and view relevant information. In addition, the data size of the visual is typically smaller than the source data, which reduces storage costs and/or transmission costs of the visual relative to the transmission of the underlying data. Moreover, the techniques disclosed herein improve computing resource efficiency through more efficient use of display space. Specifically, an intuitive and fixed-size security report visual can reduce processing and energy resource consumption than would be required to display a more complex or inconsistent security report visual.

In another example of the technical benefit of the present disclosure, the security report visual can improve overall system security by providing visibility into potential security vulnerabilities. As mentioned above, many existing visualization solutions may prioritize visual clarity, and thus, lack a sufficient level of information to enable a user to accurately assess the security of a computing system. Likewise, a solution that prioritizes information density may be too visually complex for a user to easily understand, leading to poor visibility of potential vulnerabilities. In contrast, the parallel axes of the security report visual can enable a user to observe trends in security event types over time and the effectiveness of a given security policy in remediating said security events. Moreover, the user can optionally apply filters to the security report visual on a security event type and/or outcome basis to determine whether a given computing environment and/or security policy is especially vulnerable to a particular security event type.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The techniques described herein enhance the operation of computer security systems through an intuitive security report visual utilizing a pair of parallel axes, corresponding sets of variable-thickness lines, and/or a graphical user interface (GUI) element to illustrate security events that are detected over a predefined time period (e.g., thirty days). As mentioned above, the first axis can include a plurality of sequentially ordered type-specific time-series segments that each represent the predefined time period. For example, a first time-series segment of the first axis can be associated with an "access using a valid account" security event type while a second time-series segment of the first axis can be associated with a "phishing" security event type. Accordingly, a first line that originates at a point within a type-specific time-series segment of the first axis and terminates within the GUI element can represent an occurrence of one or more security events of the associated security event type during a time unit (e.g., a day) of the predefined time period. In addition, the thickness of the first line can represent the number of attacks that occurred in the time unit. For example, a first line representing six security events of a particular type detected on one day can have a greater thickness than a first line representing two security events of the particular type detected on another day.

A second axis parallel to the first axis can include a first outcome time-series segment representing security events that are not remediated and a second outcome time-series segment representing security events that are remediated. As such, a second line of a plurality of second lines that originates within the GUI element and terminates at a point within a time-series segment of the second axis can represent a number of security events, regardless of type, that are remediated or not remediated. Similar to a first line, the thickness of a second line can represent the number of security events, of multiple types, that were remediated or not remediated on a given time unit, depending on which segment of the second axis the second line terminates within.

Various examples, scenarios, and aspects that enable generation of intuitive security report visual are described below with respect to FIGS. 1-7.

Figure 1:
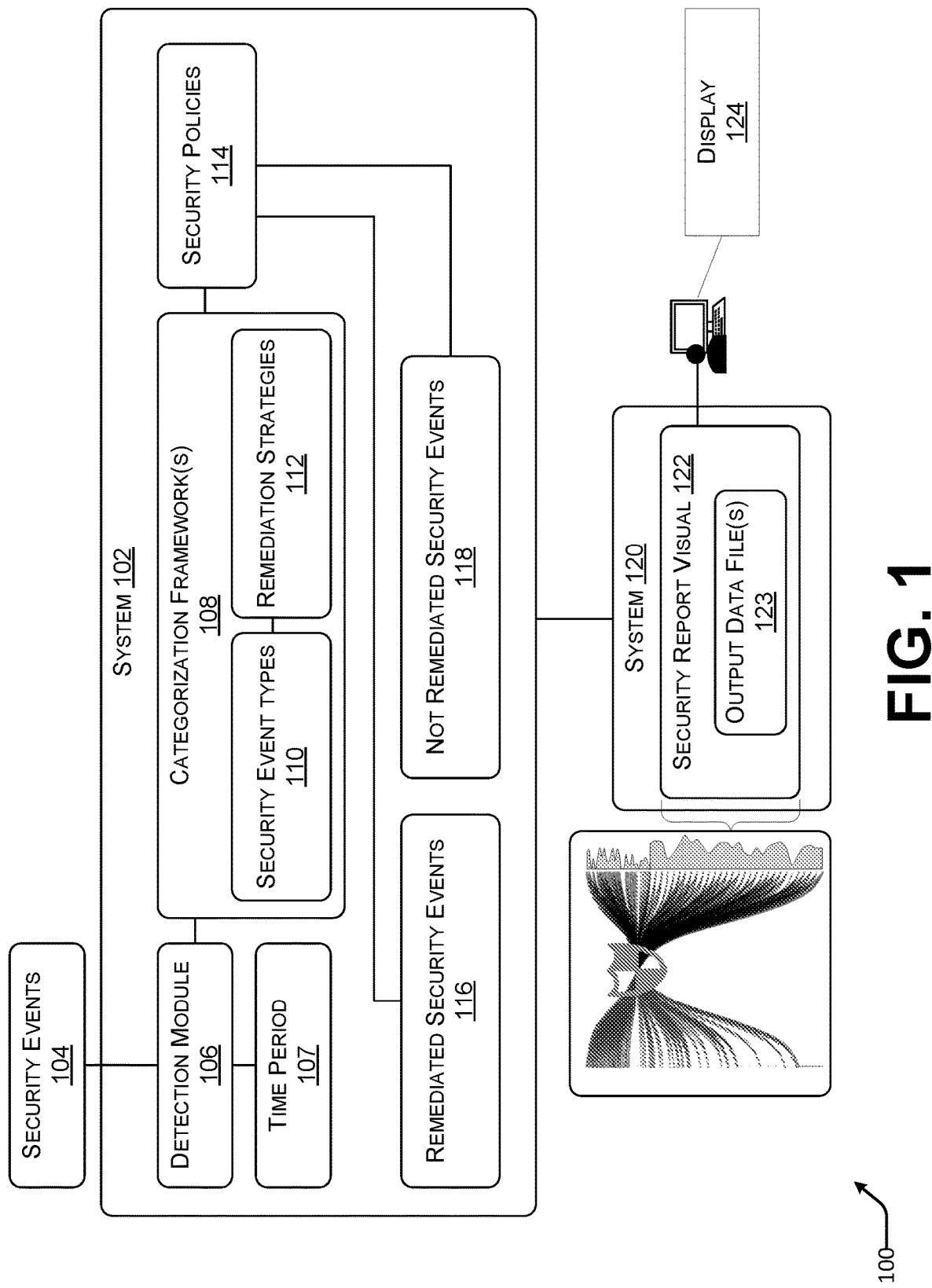
FIG. 1 is a block diagram of system(s) for detecting security events in a computing environment and for generating a security report visual containing a pair of parallel axes and corresponding sets of lines.

FIG. 1 illustrates an environment 100 in which a system 102 can be enabled to detect incoming security events 104 utilizing a detection module 106. In various examples, the system 102 can be a cloud computing system (e.g., a datacenter) that serves external entities such as customers and tenants. Alternatively, the system 102 can be a personal computing device such as a laptop or smartphone. Accordingly, a security event can be any unauthorized activity that compromises the security of the computing environment 102 such as a brute force password spraying attack or phishing.

To identify the presence of a security event, the detection module 106 can be configured with a predefined time period 107 (e.g., an hour, a day, a week, a month, a year) during which the detection module 106 can track and organize the security events 104. That is, a security event 104 that occurred during the time period 107 is not included in security event data for a different time period. In addition, the detection module 106 can be configured with a categorization framework 108 that can define a set of security event types 110 and associated remediation strategies 112. In a specific example, the categorization framework 108 can be the MITRE ATT&CK framework by the MITRE CORPORATION. As different security event types 110 can possess different accompanying characteristics, the categorization framework 108 can enable the detection module 106 to observe and record these characteristics. In a specific example, a brute force password spray security event can be characterized by a large number (e.g., thousands or millions) of repeated password entry attempts. In another example, a phishing security event can be characterized by a suspicious link within an email or other message.

Furthermore, the remediation strategies 112 defined by the categorization framework 108 can inform a set of security policies 114 for addressing security events 104. That is, the security policies 114 can apply the remediation strategies 112 to address a security event 104. In various examples, the remediation strategies 112 can include best practices developed by specialized organizations, governmental agencies, or other industry partners to construct threat models across many security event types 110. In various examples, the security policies 114 can be developed by a cloud computing provider for use by customers and thus tenants of the customers. Alternatively, a customer can develop a set of security policies 114 that is customized for a particular use case.

Based on the outcome of applying the security policies 114 to a given security event 104, the security event 104 can be categorized as a remediated security event 116 or a not remediated security event 118. As mentioned above, modern security events can be deeply sophisticated attacks that adapt to various remediation strategies 112 and highly numerous (e.g., hundreds or thousands per month) especially for large systems 102. As such, remediating all security events 104 may be infeasible even for resilient security policies 114 leading to some security events that are not remediated 118.

To provide visibility into the complex security operations of the system 102, the system 102 can pass information, including the security events 104, the security event types 110, and whether a security event is a remediated security event 116 or a non-remediated security event 118, to another system 120 that is configured to generate a security report visual 122 that can present the number of security events 104 reported by the detection module 106, the volume of security events 104 by security event type 110, as well as the outcomes of the security policies 114 in terms of remediated security events 116 and not remediated security events 118. Subsequently, the system 120 can generate one or more output data files 123 (e.g., in a scalable vector graphic (SVG) format) that defines a human-readable version of the security report visual 122, which enables or causes the display 124 of the security report visual 122. In one example, the system 102 and the system 120 are operated by the same entity. In another example, the system 102 and the system 120 are operated by different entities—a first entity that is tasked with detecting the security events and attempting to remediate the security events and a second entity that is tasked with reporting the detected security events and the attempts to remediate security events.

Figure 2:
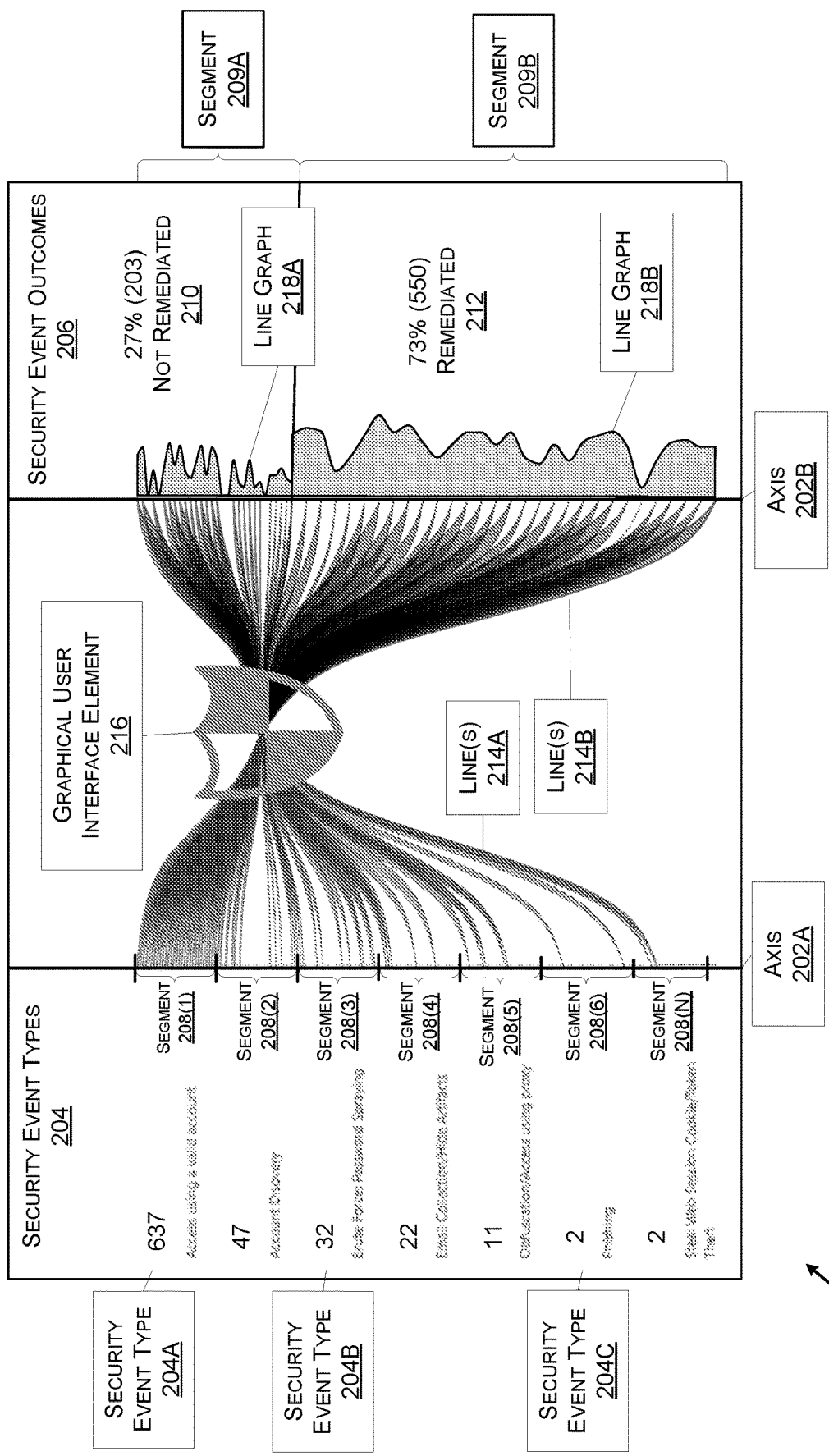
FIG. 2 illustrates an example of a security report visual containing a pair of parallel axes and corresponding lines representing security event volume, type, and/or outcome.

Turning now to FIG. 2, aspects of a security report visual 200 (e.g., security report visual 122) are shown and described. As mentioned above, the security report visual 200 can include a first axis 202A and a second axis 202B that is parallel to the first axis 202A. While the axes 202A and 202B are shown in a vertical configuration and described with "left" and "right" in FIG. 2, it should be understood that the axes 202A and 202B may be alternatively displayed in a horizontal configuration or other configuration (e.g., various orientations, such as diagonal configuration in which the axes 202 are configured at a thirty degree angle or a forty-five degree angle) given that the axes 202A and 202B are parallel. The first axis 202A is associated with a plurality of security event types 204 on the lefthand side of the security report visual 200 while the second axis 202B is associated with security event outcomes 206 on the righthand side of the security report visual 200.

The axes 202A and 202B are portioned into various time-series segments. For instance, the first axis 202A is logically portioned into a plurality of type-specific time-series segments 208(1-N), where N is a positive integer number-N is equal to seven in the example of FIG. 2. In some implementations, the time-series segments may be separated by tick marks. Stated another way, a pair of tick marks can demarcate a time-series segment 208(1) for an individual security event type 204A. In some implementations, the time-series segments may omit a visual indicator between the time-series segments. Moreover, each time-series segment 208(1-N) can represent the predefined time period (e.g., thirty days) for which the security report visual 200 is generated. In the example illustrated in FIG. 2, the time-series segments 208(1-N) can vary in visual size to accommodate various volumes of data. For example, the first segment 208(1) representing "637" security events can be larger than the second segment 208(2) representing two security events. In an alternative example, each of the time-series segments 208(1-N) can be an equal size (e.g., equal distance or length on a display screen).

On the lefthand side of the security report visual 200, an individual security event type 204A can be listed along with a number of security events of the security event type 204A that occurred during the predefined time period. For instance, the security report visual 200 shows that there were "637" occurrences of an "access using a valid account" security event type 204A. Likewise, the security report visual 200 shows that there were "32" occurrences of a "brute force: password spraying" security event type 204B and "2" occurrences of a "phishing" security event type 204C. In this way, a user can immediately view the overall volume of security events as well as the prevalence of individual security event types 204 within a given computing environment (e.g., a cloud computing tenant).

On the righthand side of the security report visual 200, the second axis 202B can be partitioned into a first outcome time-series segment 209A associated with security events that are not remediated 210 and a second outcome time-series segment 209B associated with security events that are remediated 212. Like the security event type 204A, each outcome time-series segment 209A and 209B can represent a number of security events, regardless of type, that resulted in each outcome during the predefined time period. Accordingly, each outcome time-series segment 209A and 209B can list a constituent number of security events in absolute terms as well as a percentage of the total number of security events. For example, as shown in FIG. 2, of the "753" security events across all security event types 204, "550" or "73" percent were remediated 212 while "203" or "27" percent were not remediated 210.

As discussed above, an individual time-series segment of the first axis 202A or the second axis 202B can include points representing a plurality of time units within the larger predefined time period (e.g., weeks within a year, days within a month, hours within a day, minutes within an hour). However, a given segment can contain an arbitrary number of time units, and thus, potential points of origination or termination. In one example, the first axis 202A contains a total number of potential origination points for first lines that is determined based on a number of security event types and a number of time units within the predefined time period, while the second axis 202B contains a total number of potential termination points for second lines that is twice the number of time units within the predefined time period. Accordingly, the number of potential points along an axis varies based on the predefined time period and/or the number of security event types.

As shown in FIG. 2, a plurality of first lines 214A can originate at points within time-series segments 208(1-N) based on a security event type 204. For instance, the segment 208(1) of the first axis 202A represents the "access using a valid account" security event type 204A. As such, lines 214A that originate from this segment 208(1) represent security events of the security event type 204A that occurred during a certain time unit of the time period. In various examples, the thickness of an individual line 214A, determined based on a calculated width, can represent a number of security events of a particular security event type 204 that occurred during the associated time unit. That is, a thicker line 214A can represent a greater number of security events than a thinner line 214A.

In addition, the lines 214A can terminate within a graphical user interface element 216. As shown, the graphical user interface element is positioned at a location between the first axis 202A and the second axis 202B (e.g., a central location). Generally described, the graphical user interface element 216 can be an icon or logo representing a security policy or other computer security mechanism that receives and processes security events. As such, a line 214A extending from the first axis 202A to the graphical user interface element 216 can represent incoming security events being processed by a security policy based on type and time. In various examples, the lines 214A can be color coded based on the associated security event types 204. For example, lines 214A representing security events of the first security event type 204A can be rendered in a first color while lines 214A that represent security events of the second security event type 204B can be rendered in a second color.

A plurality of second lines 214B originate within the graphical user interface element 216 and terminate at a respective point along the second axis 202B. Where the first lines 214A represent incoming security events to be processed by the security policy, the second lines 214B represent security events that have been processed (e.g., handled). As such, the outcome time-series segment 209A or 209B within which a line 214B terminates can indicate an outcome, either remediated 210 or not remediated 212. Furthermore, each outcome time-series segments 209A or 209B can likewise include points representing a plurality of time units within the predefined time period and thus potential points of termination for the plurality of second lines 214B. Stated another way, the point at which a line 214B terminates along the second axis 202B can represent a time unit at which the associated security event was processed and an outcome was determined. As will be further elaborated upon in examples below, each line 214A and 214B can originate and/or terminate at a predefined minimum width while tapering up to, but not greater than, a calculated width at the center of the line. The width of a line at the center is individually calculated for each line based on the number of associated security events. As with the first lines 214A, the second lines 214B can also be color coded based on the associated security event outcome 206. For instance, lines 214B representing security events that are not remediated 210 can be rendered in red to indicate a negative outcome while lines 214B representing security events that are remediated 212 can be rendered in blue to indicate a positive outcome.

As shown, the second axis 202B can be divided at an intersection point that can indicate a portion of the security events that are not remediated 210 versus a portion of the security events that are remediated 212. That is, the display distances (e.g., heights) of the outcome time-series segments 209A and 209B can be determined based on the number of security events that are not remediated 210 versus the number of security events that are remediated 212. Likewise, the graphical user interface element 216 can be positioned, e.g., in a direction parallel to the axes 202A and 202B (e.g., vertical position in FIG. 2), at the intersection point between the outcome time-series segment 209A representing security events that are not remediated 210 and the outcome time-series segment 209B representing security events that are remediated 212. Consequently, the effectiveness of an associated computer security system can be visually indicated by the position of the graphical user interface element 216, as well as the intersection point. In this way, the graphical user interface element 216 can provide a degree of gamification in which a user can be incentivized to improve system security as the graphical user interface element 216 moves within the security report visual 200. Consequently, the position of graphical user interface element 216 and the pluralities of first lines and second lines can provide a bowtie-like appearance to the security report visual 200. Alternatively, if the axes are configured horizontally, the position of graphical user interface element and the pluralities of first lines and second lines can provide a hourglass-like appearance to the security report visual.

In various examples, the righthand side of the security report visual 200 can include a first line graph 218A, adjacent or proximate to the axis 202B, representing security events that are not remediated 210 during the predefined time period and a second line graph 218B, also adjacent to the axis 202B, representing security events that are remediated 212 during the predefined time period. In various examples, the magnitude of the line graph 218A and/or the line graph 218B at a given point along the second axis 202B can be determined based on the number of security events represented by the associated line at a given termination point. Stated another way, the line graphs 218A and 218B can respectively synthesize, based on time unit numbers, the overall number of security events that are remediated 210 and/or the overall number of security events that are not remediated 212 over the predefined time period 208. In this way, the security report visual 200 can provide a variety of options for a user to gain insight into the security of an associated computing environment in a visually legible manner without compromising information density thereby streamlining security operations. In this way, the thickness of the lines 214B and/or the line graphs 218A and 218B can be utilized to represent an amount of security event outcomes 206 on an individual time unit basis.

While the examples of the security report visual 200 shown FIG. 2 are generally described in the context of computer security (e.g., security events, security event types 204, security event outcomes 206), it should be understood that a visual having a similar appearance (e.g., bowtie-like, hourglass-like) can be utilized to organize any collected set of data (e.g., data events) based on various attributes and outcomes. In a specific example, a visual can be utilized to track inventory for a grocery retailer (e.g., for internal expense tracking). Accordingly, various food items can be categorized along the first axis 202A by type. For instance, a first segment 208(1) can be associated with apples while a second segment 208(2) can be associated with oranges and so forth. As such, an individual segment can include attribute units to further sort food items by country of origin for example. Accordingly, a line originating from a first point within the first segment 208(1) can represent a number of applies from Japan, while a second line originating from a second point within the first segment 208(1) can represent another number of apples from the United States. In addition, a line terminating within the graphical user interface element 216 can represent the associated food items being processed by the grocery retailer (e.g., inspected at a warehouse). That is, while the segments 208 and 209 in the examples discussed above relate to a temporal context (e.g., time units, time period), data events can be categorized by any suitable attribute.

Continuing with the example in the preceding paragraph, the second axis 202B can categorize food items by final outcome. For example, the first segment 209A can represent items that are suitable for consumption and sale in a grocery store while the second segment 209B can represent items that are damaged, spoiled, or otherwise unsuitable for consumption. As such, individual attribute units of the segments 209 can likewise represent countries of origin. Accordingly, the second lines 214B that originate within the graphical user interface element 216 and terminate along the second axis 202B can represent outcomes for various food items irrespective of type. Stated another way, an individual line 214B can represent a number of food items from a particular country of origin that belong to an associated outcome based on the point at which the line 214B terminates along the second axis 202B. For example, a line 214B that terminates at a point within the first segment 209A at the second axis 202B can represent a number of items from France and the United States that are unsuitable for consumption. Conversely, another line that terminates at a point within the second segment 209B can represent a number of items from Vietnam and China that are suitable for consumption.

Moreover, it should be understood that the second axis 202B can include more than two segments 209. For example, where the first outcome segment 209A can represent food items that are unsuitable for consumption and the second outcome segment 209B can represent food items that are suitable for sale in a store (and thus suitable for consumption), a third outcome segment can represent food items that are suitable for consumption but not suitable for sale in a store (e.g., blemished or misshapen produce). As such, food items represented in the first outcome segment can be subsequently distributed to grocery stores, while food items represented in the second outcome segment can be discarded (i.e., composted), while food items represented in the third outcome segment can be donated.

In various examples in which the second axis 202B comprises more than two outcome segments 209, the graphical user interface element 216 can be positioned at one of the intersection points between the outcome segments 209 to indicate a logical grouping of the outcome segments 209 above and outcome segments 209 below the intersection point. For example, continuing with the example of the grocery retailer, the graphical user interface element 216 can be positioned to highlight the total number of food items that are suitable for consumption (e.g., food items that are suitable for consumption and for sale in a store and food items that are suitable for consumption but not sale in a store). Accordingly, the outcome segments representing food items that are suitable for consumption can be grouped on one side of the graphical user interface element 216 while the outcome segment representing food items that are not suitable for consumption can be grouped on the other side of the graphical user interface element 216.

In another example, the graphical user interface element 216 can be positioned to highlight the total number of food items that are suitable for sale only. As such, the outcome segment representing food items that are suitable for consumption and sale in a store can be grouped on one side of the graphical user interface element 216 while the outcome segment representing food items that are suitable for consumption but not sale and the outcome segment representing food items that are not suitable for consumption can be grouped on the other side of the graphical user interface element 216. In this way, the position of the graphical user interface element can convey logical groupings of multiple outcome segments thereby enabling display within a smaller area and thus more efficient use of display resources.

Figure 3A:
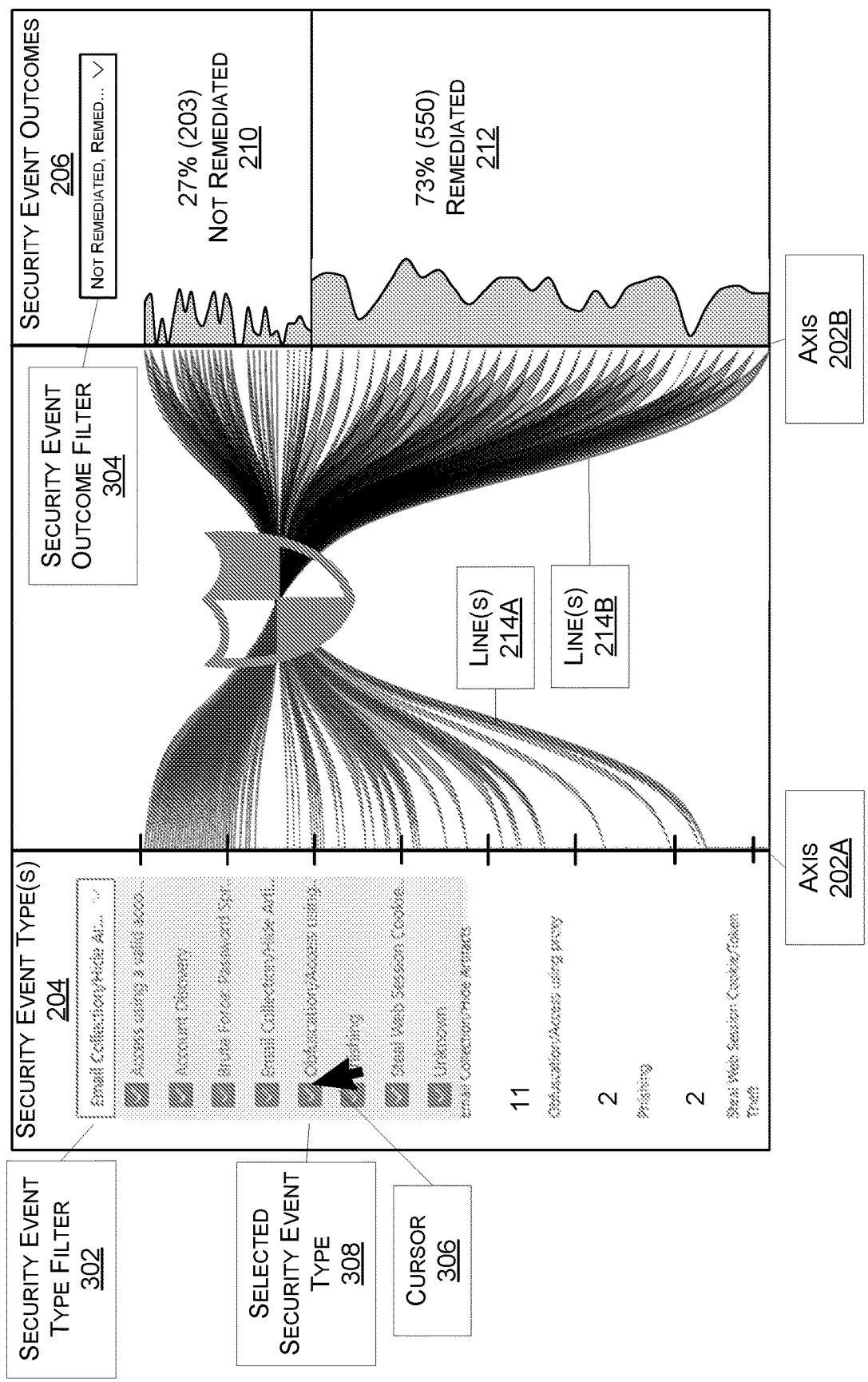
FIG. 3A illustrates a first phase of applying a security event type filter to a security report visual.

Turning now to FIG. 3A, aspects of a user configurable security event type filter 302 are shown and described. In various examples, the security event type filter 302 can be a selectable dropdown menu that can be displayed on the lefthand side of the security report visual 200 such that the security event type filter 302 is visually associated with the first axis 202A. Stated another way, the security event type filter 302 can be a component of a portion of the security report visual representing the plurality of security event types 204. Likewise, the righthand side of the security report visual 200 can include a security event outcome filter 304 to visually associate the security event outcome filter 304 with the second axis 202B and the not remediated 210 and remediated 212 security event outcomes 206.

In various examples, a user can interact with the security report visual 200 through an onscreen cursor 306 that can be controlled using a preferred input method such as a mouse, touch screen, stylus, voice, and the like. Using the cursor 306, a user can activate a selected security event type 308 of the security event type filter 302. As indicated by the check marks adjacent to each of the security event types 204. Moreover, the format of the lines 214A and 214B can be modified based on the selected security event type filter 302 and the security event outcome filter 304 respectively. For instance, as shown in the present example, all of the security event types 204 may be selected. Accordingly, every segment of the first axis 202A and associated lines 214A can be displayed within the security report visual 200.

Figure 3B:
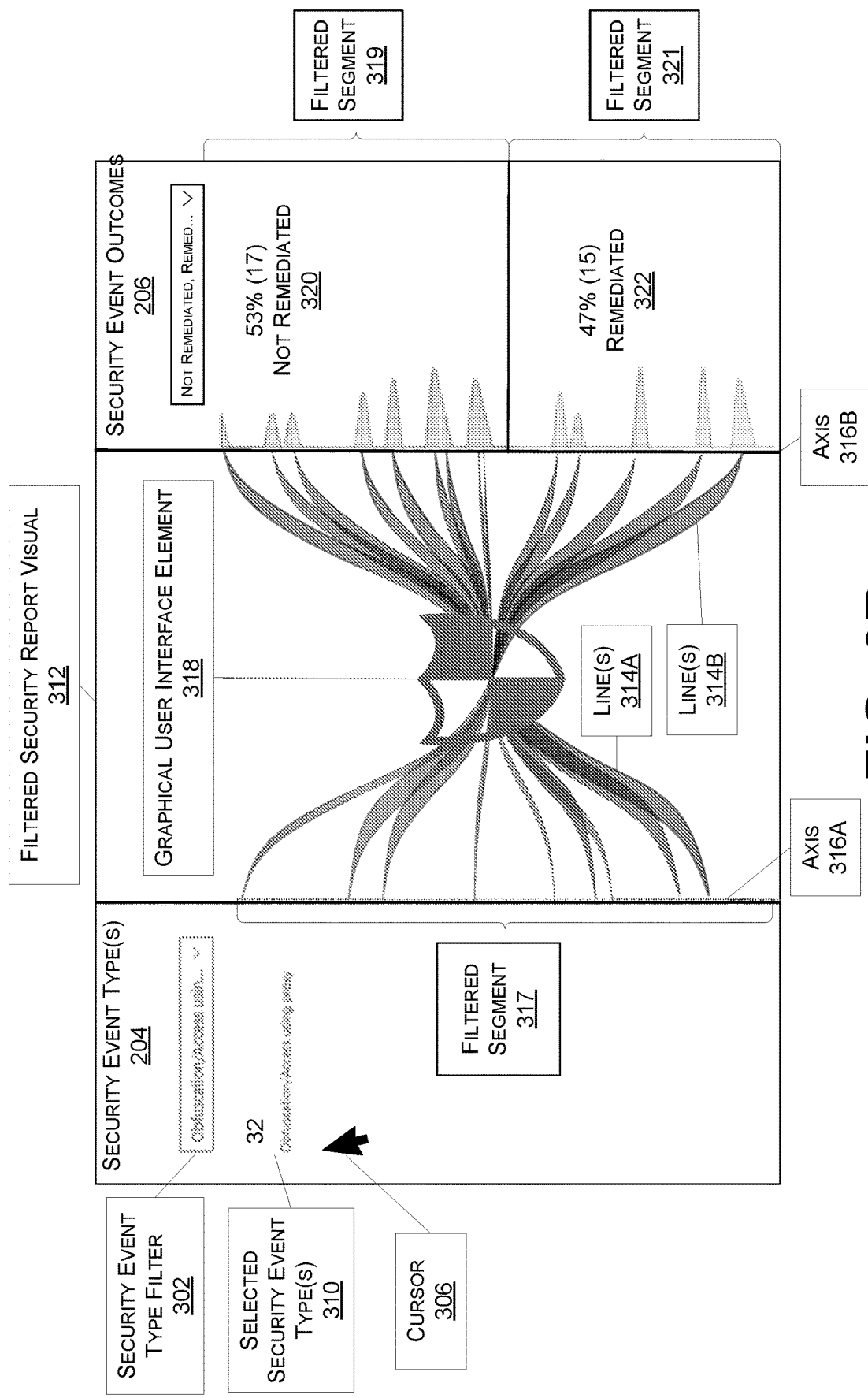
FIG. 3B illustrates a second phase of applying a security event type filter to a security report visual.

Conversely, as shown in FIG. 3B, a user may select an "obfuscation/access using proxy" security event type 310 from the security event type filter 302. In response, the security report visual 200 can be converted into a filtered security report visual 312. Accordingly, the lefthand side of the filtered security report visual 312 can be modified to remove security event types 204 that do not match the selected security event type 310. Consequently, the filtered security report visual 312 can include a changed plurality of first lines 314A and plurality of second lines 314B. Stated alternatively, the lines 314A and 314B can be restricted such that only security events that pertain to the selected security event type 310 of the security event type filter 302 remain. As such, the filtered security report visual 312 can include a first axis 316A that can include a single filtered time-series segment 317 representing the selected security event type 310 for a predefined time period instead of a plurality of time-series segments for many security event types 204.

As with the examples discussed above, the plurality of first lines 314A can represent security events of the selected security event type 310 that occur during the predefined time period (e.g., thirty days). An individual line 314A can represent a number of security events that occur during a particular time unit (e.g., a day) of the time period where the point at which the line 314A originates along the first axis 316A can represent the time unit. Moreover, the thickness of the line 314A can indicate the number of constituent security events where the greater the thickness of the line 314A, the greater the number of security events occurred at the associated time unit. In a specific example, a line 314A representing ten security events can be thicker than another line 314A representing five security events.

In addition, the plurality of first lines 314A can terminate within a graphical user interface element 318 at a location between the first axis 316A and the parallel second axis 316B. Conversely, the plurality of second lines 314B can originate from within the graphical user interface element 318 and terminate at a respective point at the second axis 316B. As discussed above, the second axis 316B can include a first filtered outcome time-series segment 319 representing security events that are not remediated 320 and a second filtered outcome time-series segment 321 representing security events that are remediated 322. Where the first lines 314A can represent security events that occurred at a particular time unit, the plurality of second lines 314B can represent security event outcomes at an associated time unit. Accordingly, the outcome time-series segment in which the second lines 314B terminate can indicate the outcome of the associated security event. As with the first lines 314A, the thickness of an individual line of the second lines 314B can indicate an associated number of security events where the greater the thickness, the greater the number of security events represented by the individual line 314B.

As described above, the second axis 316B can include an intersection point between the not remediated 320 outcome time-series segment 319 and the remediated 322 outcome time-series segment 321. In this way, the righthand side of the filtered security report visual 312 can proportionally allocate space to the not remediated 320 outcome time-series segment 319 and the remediated 322 outcome time-series segment 321 based on the number of security events associated with each security event outcome 206 and provide a visual indication of the performance of various computer security policies in relation to security event types 204. Likewise, the graphical user interface element 318 can be vertically positioned at the intersection point such that the graphical user interface element 318 reinforces the visual distinction between the not remediated 320 outcome time-series segment 319 and the remediated 322 outcome time-series segment 321.

As shown in FIG. 3B, the portion of security events that are not remediated 320 may be greater than the portion of security events that are remediated 322. Accordingly, the intersection point and consequently, the graphical user interface element 318, can be vertically positioned to show that the majority of security events of the selected security event type 310 are not remediated 320 by the various security policies represented by the graphical user interface element 318. In this way, a user can quickly and intuitively learn that, while existing security policies may be generally effective (as shown in FIG. 2), they may perform poorly against the selected security even type 310. Stated another way, the vertical positioning of the graphical user interface element 318 can indicate a vulnerability to certain security event types 204 despite being generally effective in remediating security events in general.

Figure 4A:
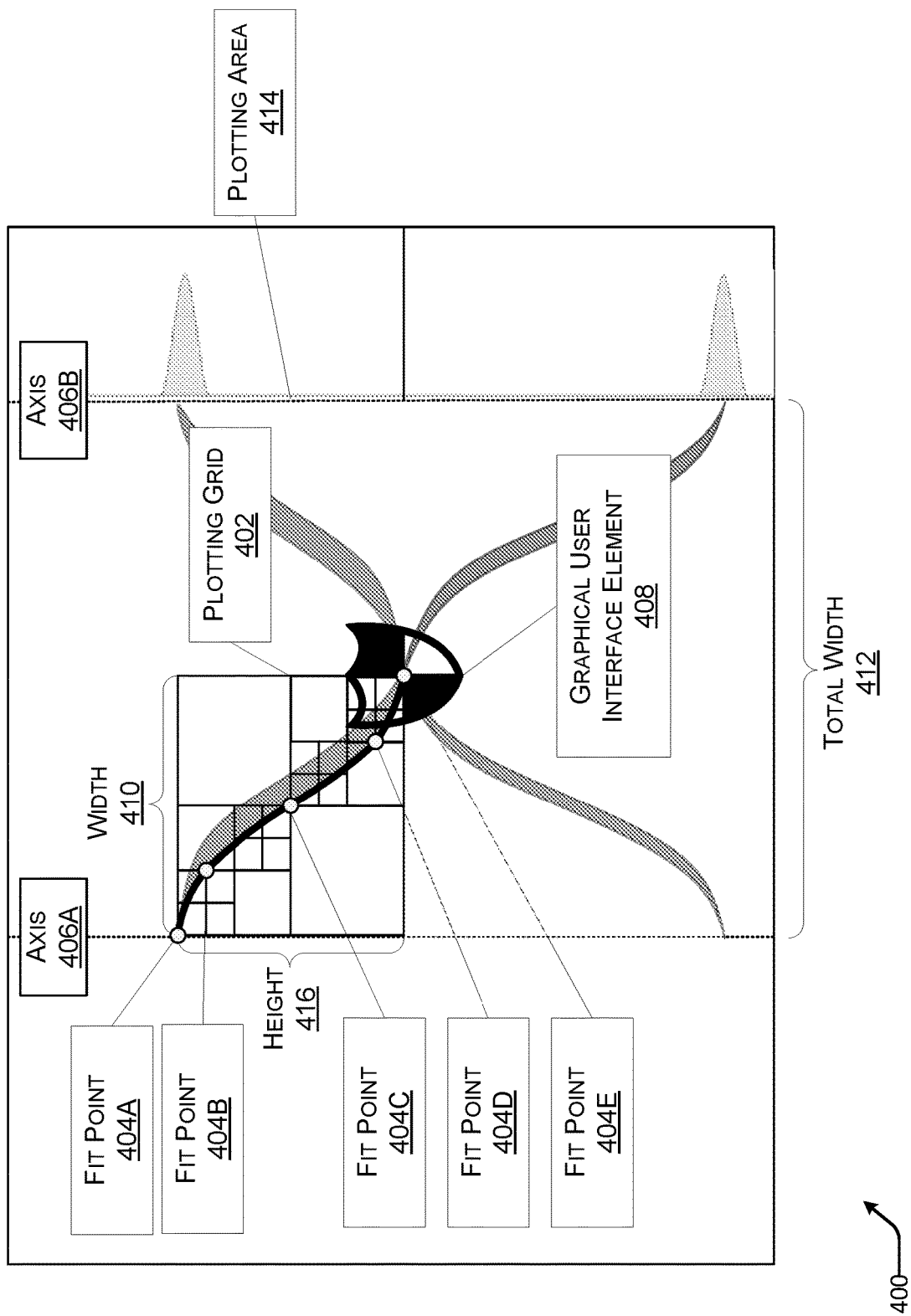
FIG. 4A illustrates a process for generating a first plurality of fit points defining a first spline of an individual line of the security report visual.
Figure 4B:
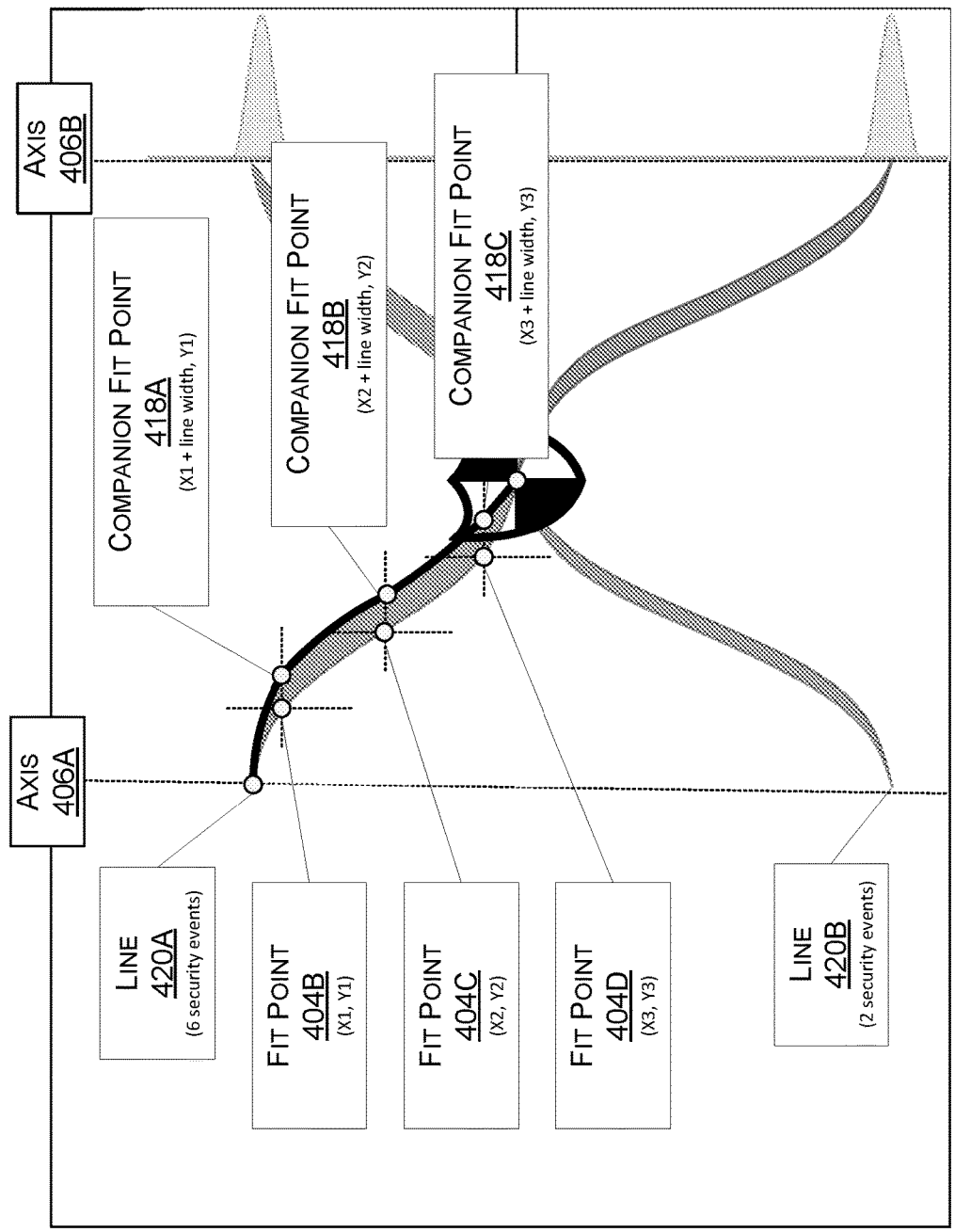
FIG. 4B illustrates a process for generating a second plurality of fit points defining a second spline of an individual line of the security report visual.

Proceeding to FIGS. 4A and 4B, a process for illustrating an individual line of a security report visual 400 utilizing a plotting grid 402 and a plurality of fit points 404A-404E defining an upper spline and a lower spline is shown and described. As described above, a line on the lefthand side of the security report visual 400 can originate at a point along a first axis 406A and terminate a point within a graphical user interface element 408. Accordingly, the origination point and the termination point can be defined as a first fit point 404A and a fifth fit point 404E. While the present examples show five fit points 404A-404E, it should be understood that any number of fit points 404 can be utilized.

In various examples, the location of the first fit point 404A (the origination point) along the first axis 406A can be defined by a time at which an associated security event occurred as well as the security event type. In addition, the location of the fifth fit point 404E (the termination point) can be defined by the vertical position of the graphical user interface element 408 which itself can be defined by the portion of security event that are remediated versus the portion of security events that are not remediated, as discussed above. As such, a plotting grid 402 can be defined by the first fit point 404A and the fifth fit point 404E where the width 410 of the plotting grid 402 can be defined as one half of a total width 412 of a plotting area 414 of the security report visual 400. In addition, the height 416 of the plotting grid 402 can be defined as the vertical distance between the first fit point 404A and the fifth fit point 404E. As shown, the plotting grid 402 can be evenly divided into a number of sections vertically and horizontally to ensure sufficient granularity to plot a smooth line. Stated another way, an individual cell of the plotting grid 402 can be one eighth the width 410 and one eighth the height 416 of the plotting grid 402. It should be understood however, that the plotting grid 402 can be defined using any suitable number of cells.

Accordingly, the location of a second fit point 404B can be defined at one quarter the width 410 of the plotting grid 402 and one eighth the height 416 of the plotting grid 402. Similarly, the location of the third fit point 404C can be defined as one half the width 410 and one half the height 416 or a location that is midway between the first fit point 404A and the fifth fit point 404E. Finally, the location of a fourth fit point 404D can be defined as three quarters of the width 410 and seven eights of the height 416 of the plotting grid 402. In this way, the plotting grid 402 can smoothly define a lower spline of the line as shown by the thick curve joining the five fit points 404A-404E. Moreover, the same process can be applied to a line traversing the right-hand side of the security report visual 400 where the origination point can be defined based on the vertical position of the graphical user interface element 408. Likewise, the termination point can be defined as a point along the second axis 406B based on an outcome of the associated security event and a time at which the security event was processed by a computer security policy.

Turning now to FIG. 4B, a set of companion fit points 418A-418C can be subsequently defined based on the initial set of fit points 404A-404E to plot an upper spline of the line 420A. Namely, the fit points 404B-404D that are not the origination fit point 404A and the termination fit point 404E are used to distinguish the upper spline from the lower spline. In various examples, the upper spline can utilize the same fit points 404A and 404E as the origination point and termination point respectively. As described above, an individual line 420A can be a variable thickness line where the thickness can be proportional to a number of security events associated with the line 420A. Moreover, it should be understood that while the line 420A is illustrated as having a given opacity (e.g., fully opaque), the line 420A can be rendered with a variable opacity. That is, the area bounded by the lower spline defined by the fit points 404 and the upper spline defined by the companion fit points 418, can be rendered with a predetermined level of transparency. As such, the transparency can prevent overlapping lines, such as the lines 214A shown and discussed above, from obscuring one another.

For the purposes of discussion, each fit point 404B-404D can be assigned a pair of coordinates (X, Y) defining a position of the associated coordinate within the security report graphic 400. For instance, the fit 404B can be located at a position (X1, Y1) while the fit 404C can be located at a position (X2, Y2). Likewise, the fit 404D can be located at a position (X3, Y3). Accordingly, to define an upper spline of the line 420A, the companion fit points 418A-418C can be permutations of the coordinates of a fit point at the same vertical position (e.g., Y coordinate). For instance, the location of the first companion fit point 418A can be defined based on the coordinates of the fit point 404B (X1, Y1) and a calculated line width.

In the present example, in which the axes 406A and 406B are vertically oriented, the line width can be applied to the horizontal position (X) of the companion fit point 418A and not the vertical position (Y) of the companion fit point 418A. That is, the position of the companion fit point 418A can be defined as (X1+line width, Y1). In this way, the first fit point can be horizontally offset, e.g., based on a calculated width, from the fit point 404B but vertically aligned with the fit point 404B. Similarly, the position of the second companion fit point 418B can be defined as (X2+line width, Y2) while the position of the third companion fit point 418C can be defined as (X3+line width, Y3). Moreover, the same coordinate calculation can be applied to lines on the right-hand side of the security report visual where, given a lower spline, the line width can be subtracted (e.g., X−line width) to horizontally offset an upper spline from the lower spline. Alternatively, for a security report visual in which the axes 406A and 406B are horizontally oriented, the line width can be applied to the vertical coordinate (Y) of each companion fit point 418A-418C rather than the horizontal coordinate (X).

In another alternative example, the fit points 404A-404E can define a central spline for the line 420A. Accordingly, both the lower spline and the upper spline can be defined by companion fit points that are calculated based on the location of the central fit points 404A-404E and the line width.

For example, given a central fit point at a position (X1, Y1), the location of a first companion fit point of the lower spline can be defined as (X1−(line width/2), Y1) while the location of a second companion fit point of the upper spline can be defined as (X1+(line width/2), Y1) such that the lower spline and the upper spline collectively express the full line width.

In still another example, given the central spline mentioned above, the line 420A can be defined by a first spline and a second spline. The first spline can be defined by a first companion fit point that is offset from the central spline by the full line width, a second companion fit point that is offset from the central spline by half the line width, and a third companion fit that is not offset from the central spline. Conversely, the second spline can be defined by a first companion fit point that is not offset from the central spline, a second companion fit point that is offset from the central spline by half the line width, and a third companion fit point that is offset from the central spline by the full line width.

In general, it should be understood that the adjustments to the fit points 404A-404E, and/or the companion fit points 418A-418C can differ for each spline. For example, the adjustments to create a spline to express a line width may depend on the origination point, and/or where the origination point is relative to the termination point which may be defined based on the overall proportion of security events that are remediated versus security events that are not remediated. For instance, the security report visual may ensure all the lines 420A expressing a given line width are within a virtual boundary box defined by the outermost potential origination points along the first axis 406A (e.g., a type-specific time-series segment). As such, the security report visual can ensure that a graph with known count of security event types and a known count of predefined time periods can always result in a consistent size of security report visual 400. In a specific example, the virtual boundary box can be defined by two line segments. A first line segment between the most extreme (e.g., highest and lowest) potential origination points along the first axis 406A and a second line segment comprising a parallel projection of the first line segment which passes through the termination point (e.g., within the graphical user interface element 408).

In another example, the security report visual may also ensure a clean separation between segments of the axes 406A and 406B (e.g., type-specific time-series segments, outcome time-series segments) such that the splines expressing a line width do not overlap between segments. In a specific example, consider the second axis 406B which can comprise two segments, a first segment representing security events that are not remediated and a second segment representing security events that are remediated. As such, the termination point of a line at the second segment can be defined by the outcome of the associated security event (e.g., remediated, or not remediated) as well as the time unit at which the security event was processed.

In one instance, the vertical offsets to the splines expressing a line width can be adjusted to ensure the splines remain within a segment boundary. In such a situation any such adjustment can be applied to both the first spline's and second spline's corresponding fit points in equal measure. In a specific example, if a fit point of a one spline is vertically adjusted such that Y+12, but must be reduced by two to ten, then the corresponding fit point of the other spline can be similarly reduced by two thereby maintaining a consistent Y width. In another example, if a fit point of a first spline is adjusted such that X is −13, but must be increased by four to −9, then the corresponding fit point of the other spline can be similarly increased by four to maintain a consistent X width.

For a more complex virtual boundary such as an axis 406A containing three or more segments, or if the termination point is not perpendicular to an intersection point between two segments, the virtual boundary between two adjacent segments can be defined by a virtual control spline of width zero, wherein the origination point of the virtual control spline can be halfway between the closest potential origination points of the two adjacent segments. As such, the security report visual can generate control splines between segments as a virtual boundary between the segments such that splines of each segment expressing a line width do not cross the virtual boundary defined by the control spline. Accordingly, crossing a virtual boundary in the present context can be defined by two or more points of intersection between the boundary spline and the first spline and/or the second spline of a line 420A (excluding origination point and termination point (e.g., fit point 404E) where common with the control spline).

As discussed above, the line thickness, e.g., determined based on a calculated width, can visually represent a number of security events associated with the line 420A. For instance, a first line 420A representing six security events can have a relatively greater thickness than a second line 420B representing two security events. The width can be calculated using a variety of methods to visually express the number of security events associated with a given line 420A without generating excessive visual clutter. That is, the number of security events that occurred at a given time unit (e.g., a day). Stated alternatively, the width can be a function of the number of attacks a given time unit wherein the time unit defines an origination point along an axis 406A or a termination point along an axis 406B for an associated line 420A.

In a specific example, the function can be a linear scaling function in which the width is directly proportional to the number of associated security events as defined by a scaling factor. In various examples, the scaling factor can be dynamically adjusted based on the volume of security events to be plotted in the security report visual. For a small number of security events (e.g., tens), the scaling factor can be relatively large (e.g., five) to communicate the proportional difference between various lines 420A and 420B. That is, a large scaling factor can express the proportional difference between two and six while being unhelpful in expressing the proportional difference between two, six, and six hundred. Accordingly, for a large number of security events (e.g., thousands), the function can be a logarithmic scaling function to ensure that line widths are not unduly wide for a given security report visual. In this way, relatively minute differences in the number of security events can be obscure while expressing relatively major differences. For instance, the difference between "1000" security events and "1500" security events can be visually communicated as different line widths but not the difference between "1000" security events and "1020" security events.

Moreover, different lines 420A and 420B of the same security report visual 400 can have line widths that are calculated using different methods based on a threshold value. For example, consider a first line 420A representing "1000" security events and a second line representing ten security events. Applying a linear scaling function to calculate both line widths can result in a first line 420A that is unduly wide and obscures much of the security report visual whereas the second line 420B may have a visually acceptable width. Likewise, applying a logarithmic scaling function to calculate both line widths can result in a first line 420A having an acceptable width but a second line 420B with a width so miniscule as to be invisible. As such, a threshold value (e.g., 500) can be defined such that a logarithmic scaling function can be utilized to calculate the line width for a line 420A representing a number of security events that does satisfy the threshold value. Conversely, a linear scaling function can be utilized to calculate the line width for a line 420B representing a number of security events that does not satisfy the threshold value. In this way, the security report visual 400 can ensure consistently legible line widths thereby enhancing intuitiveness. Moreover, utilizing a plotting grid 402 as shown in FIG. 4A can enable a fixed-size security report visual 400. Consequently, the fixed-size security report visual 400 can reduce processing time and computing resource consumption. This is due to layouts that can be predetermined (rather than dynamically generated after the lines are generated), and the security report visual 400 can be updated without adjusting page layout because it retains the same size.

As illustrated in FIGS. 4A and 4B, an individual line 420A can taper to a point on the first fit point 404A and the fifth fit point 404E while expanding to a given line width expressed by the companion fit points 418A. That is, the line 420A can begin at a predefined (e.g., minimum) width at a point of origination (the first fit point 404A) and end at the same predefined width at a point of termination (the fifth fit point 404E). As such, the line width that the line 420A expands to can be focused on a central point that is equidistant to the point of origination and the point of termination. Accordingly, the thickness of a given line 420A can be defined by the companion fit points and/or the adjustments thereof, as described above. The calculated width for an individual line can be constrained by a maximum width to prevent lines that represent a large number of events from obscuring other lines (e.g., consuming a large part of the visual). Moreover, it should be understood that every line 420 of the security report visual 400 can begin and end at the same minimum width (e.g., tapering to a point). That is, while every line 420 can originate and terminate at the same minimum width, the thickness of a given line can relate to the line width proximate to the central point equidistant to the point of origination and the point of termination.

Figure 5:
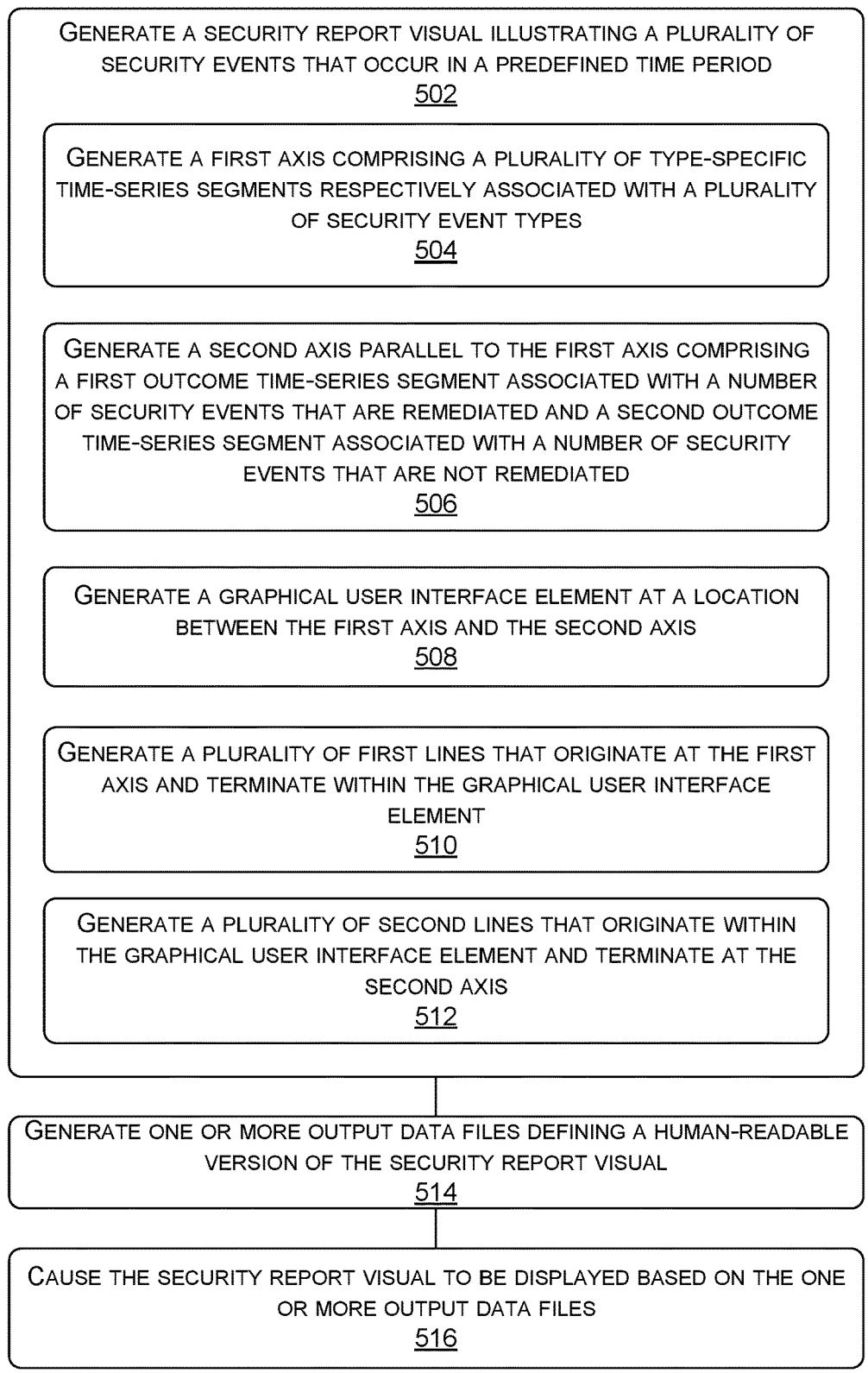
FIG. 5 is a flow diagram showing aspects of a method for generating a security report visual comprising a first axis, a second axis that is parallel to the first axis, a graphical user interface element at a location between the first axis and the second axis, a plurality of first lines that originate along the first axis and terminate within the graphical user interface element, and a plurality of second lines that originate within the graphical user interface element and terminate along the second axis.

Proceeding to FIG. 5, aspects of a method 500 for generating an intuitive security report visual are shown and described. With reference to FIG. 5, the method 500 begins at operation 502 where a system generates a security report visual illustrating a plurality of security events that occur in a predefined time period.

As shown, operation 502 can include sub-operations. For example, at sub-operation 504, the system generates a first axis comprising a plurality of type-specific time-series segments respectively associated with a plurality of security event types.

At sub-operation 506, the system generates a second axis parallel to the first axis comprising a first outcome time-series segment associated with a number of security events that are remediated and a second outcome time-series segment associated with a number of security events that are not remediated.

At sub-operation 508, the system generates a graphical user interface element at a location between the first axis and the second axis.

At sub-operation 510, the system generates a plurality of first lines that originate along the first axis and terminate within the graphical user interface element. In one example, a first line of the plurality of first lines originates at a point along the first axis that is within a type-specific time-series segment associated with a particular security event type and that corresponds to a particular time unit within the predefined time period. Moreover, in this example, the first line represents a number of security events of the particular security event type that are detected, or occur, during the particular time unit.

At sub-operation 512, the system generates a plurality of second lines that originate within the graphical user interface element and terminate along the second axis. In the example of the preceding paragraph, a second line of the plurality of second lines terminates at a point along the second axis that is within the first outcome time-series segment or the second outcome time-series segment and that corresponds to a particular time unit within the predefined time period. Moreover, the second line represents a number of security events for any of the plurality of security event types that are either remediated or not remediated at the particular time unit.

Then, at operation 514, the system generates one or more output data files (e.g., in a scalable vector graphic (SVG) format) that defines a human-readable version of the security report visual.

Finally, at operation 516, the system causes the security report visual to be displayed based on the one or more output data files.

For ease of understanding, the process discussed in this disclosure is delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated method can end at any time and need not be performed in its entirety. Some or all operations of the method, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the method 500 can be implemented, at least in part, by modules running the features disclosed herein can be a dynamically linked library (DLL), a statically linked library, functionality produced by an application programing interface (API), a compiled program, an interpreted program, a script, or any other executable set of instructions. Data can be stored in a data structure in one or more memory components. Data can be retrieved from the data structure by addressing links or references to the data structure.

Although the illustration may refer to the components of the figures, it should be appreciated that the operations of the method 500 may also be implemented in other ways. In addition, one or more of the operations of the method 500 may alternatively or additionally be implemented, at least in part, by a chipset working alone or in conjunction with other software modules. In the example described below, one or more modules of a computing system can receive and/or process the data disclosed herein. Any service, circuit, or application suitable for providing the techniques disclosed herein can be used in operations described herein.

Figure 6:
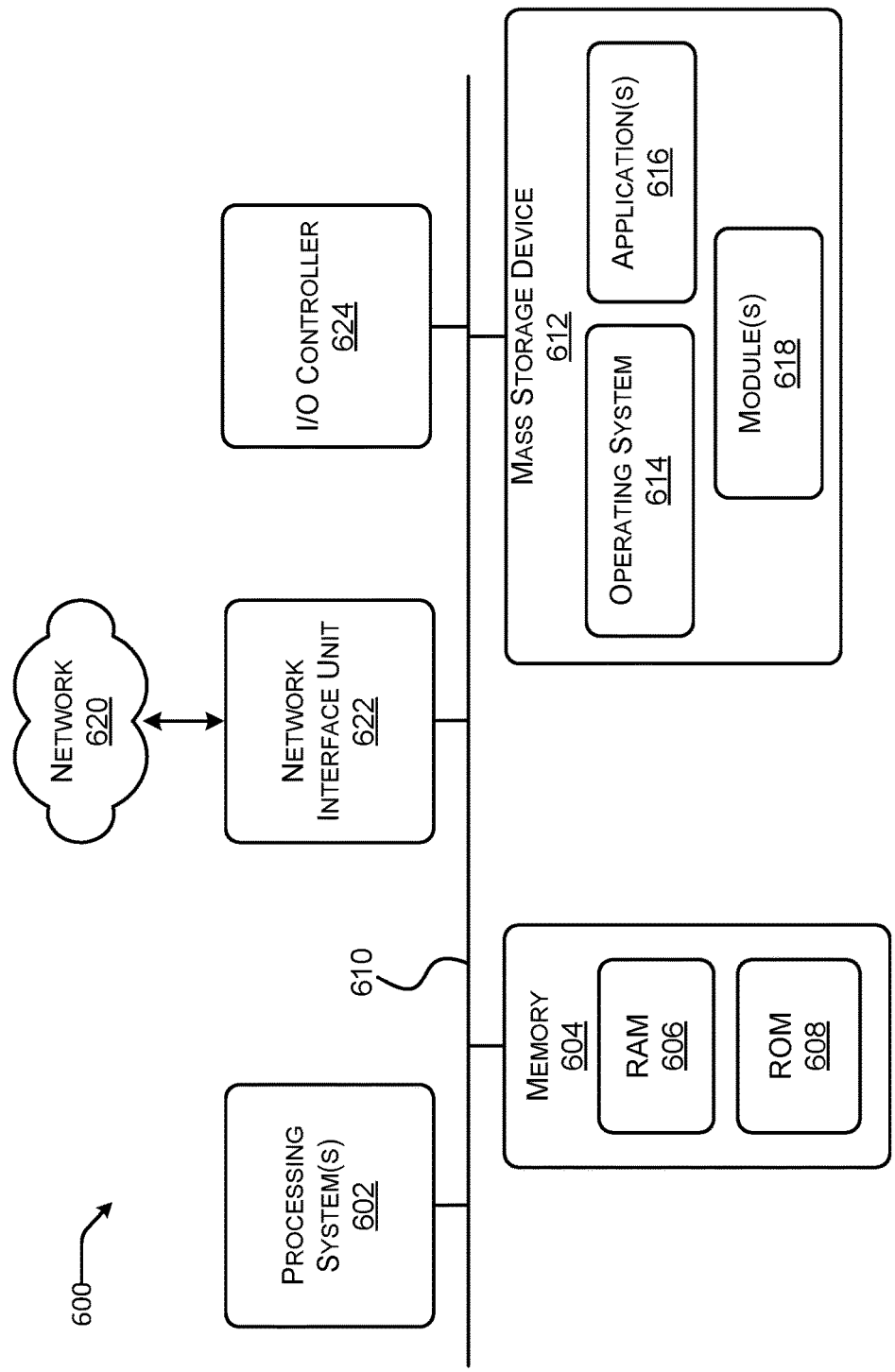
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, such as a computer or a server configured as part of system 102 and/or system 120, capable of executing computer instructions (e.g., a module or a program component described herein). The computer architecture 600 illustrated in FIG. 6 includes processing system 602, a system memory 604, including a random-access memory 606 (RAM) and a read-only memory (ROM) 608, and a system bus 610 that couples the memory 604 to the processing system 602. The processing system 602 comprises processing unit(s). In various examples, the processing unit(s) of the processing system 602 are distributed. Stated another way, one processing unit of the processing system 602 may be located in a first location (e.g., a rack within a datacenter) while another processing unit of the processing system 602 is located in a second location separate from the first location. For example, the processing system 602 can include graphical processing units (GPUs) for executing complex artificial intelligence applications such as large language models. Moreover, the systems discussed herein can be provided as a distributed computing system such as a cloud service.

Processing unit(s), such as processing unit(s) of processing system 602, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing system 602 through a mass storage controller connected to the bus 610. The mass storage device 612 and its associated computer-readable media provide non-volatile storage for the computer architecture 600. Although the description of computer-readable media contained herein refers to a mass storage device, the computer-readable media can be any available computer-readable storage media or communication media that can be accessed by the computer architecture 600.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

The software components described herein may, when loaded into the processing system 602 and executed, transform the processing system 602 and the overall computer architecture 600 from a general-purpose computing system into a special-purpose computing system customized to facilitate the functionality presented herein. The processing system 602 may be constructed from any number of transistors or other discrete circuit elements, which may individually or collectively assume any number of states. More specifically, the processing system 602 may operate as a finite-state machine, in response to executable instructions contained within the software modules disclosed herein. These computer-executable instructions may transform the processing system 602 by specifying how the processing system 602 transition between states, thereby transforming the transistors or other discrete hardware elements constituting the processing system 602.

Figure 7:
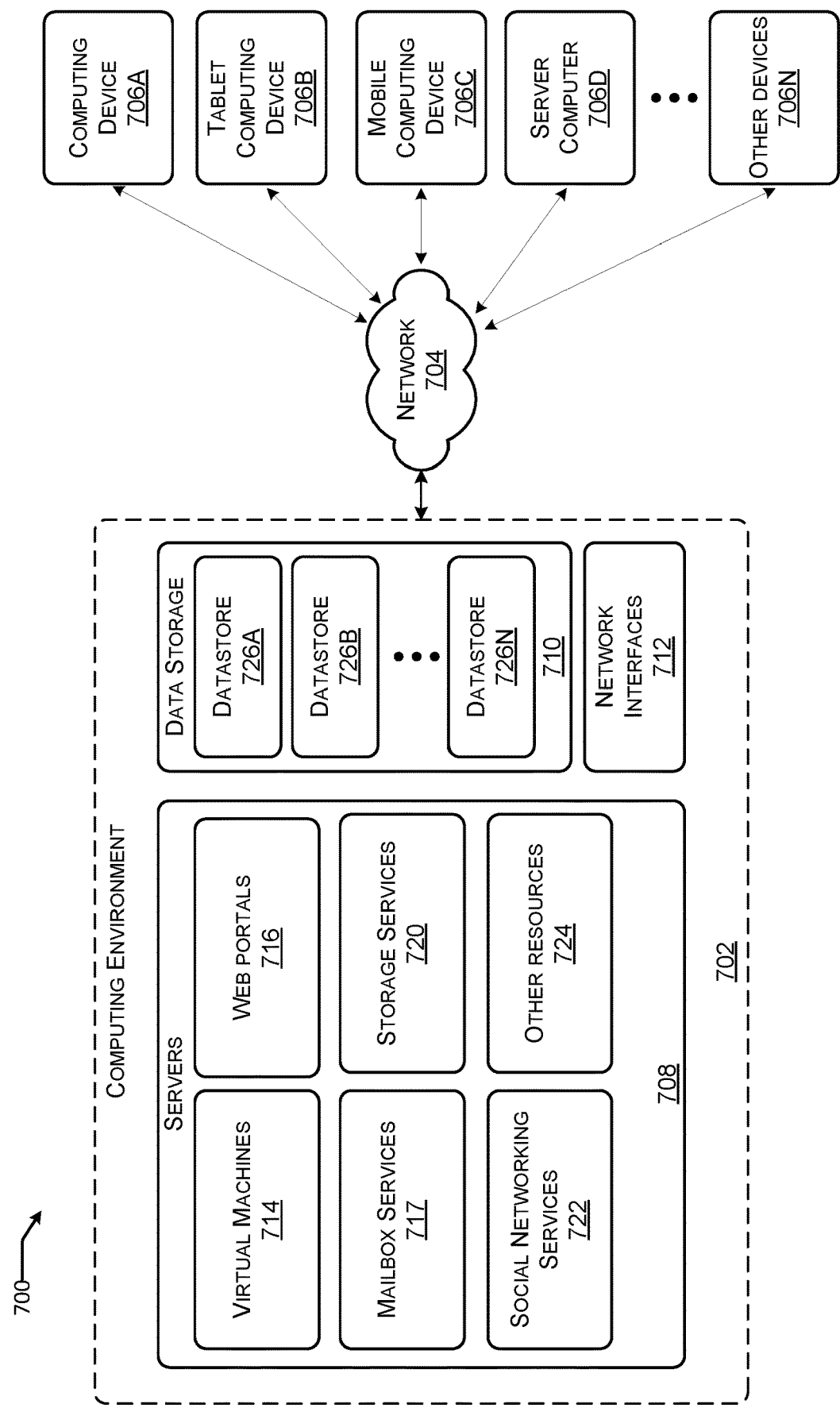
FIG. 7 is a diagram illustrating a distributed computing environment capable of implementing aspects of the techniques and technologies presented herein.

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

Accordingly, the distributed computing environment 700 can include a computing environment 702 operating on, in communication with, or as part of the network 704. The network 704 can include various access networks. One or more client devices 706A-706N (hereinafter referred to collectively and/or generically as "computing devices 706") can communicate with the computing environment 702 via the network 704. In one illustrated configuration, the computing devices 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of computing devices 706 can communicate with the computing environment 702.

In various examples, the computing environment 702 includes servers 708, data storage 610, and one or more network interfaces 712. The servers 708 can host various services, virtual machines, portals, and/or other resources. In the illustrated configuration, the servers 708 host virtual machines 714, Web portals 716, mailbox services 718, storage services 720, and/or social networking services 722. As shown in FIG. 7 the servers 708 also can host other services, applications, portals, and/or other resources ("other resources") 724.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more servers configured to host data for the computing environment 700. The data storage 710 can include, host, or provide one or more real or virtual datastores 726A-726N (hereinafter referred to collectively and/or generically as "datastores 726"). The datastores 726 are configured to host data used or created by the servers 808 and/or other data. That is, the datastores 726 also can host or store web page documents, word documents, presentation documents, data structures, algorithms for execution by a recommendation engine, and/or other data utilized by any application program. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects.

The disclosure presented herein also encompasses the subject matter set forth in the following clauses.

Example Clause A, a system comprising: one or more processing units; computer-readable storage media storing instructions that, when executed by the one or more processing units, cause the system to perform operations comprising: generating a security report visual illustrating a plurality of security events that occur in a predefined time period, the security report visual comprising a first axis, a second axis that is parallel to the first axis, a graphical user interface element at a location between the first axis and the second axis, a plurality of first lines that originate along the first axis and terminate within the graphical user interface element, and a plurality of second lines that originate within the graphical user interface element and terminate along the second axis, wherein: the first axis comprises a plurality of type-specific time-series segments respectively associated with a plurality of security event types, wherein each of the plurality of type-specific time-series segments is an equal size to other type-specific time-series segments in the plurality of type-specific time-series segments; each type-specific time-series segment of the plurality of type-specific time-series segments is associated with the predefined time period; a first line of the plurality of first lines originates at a point along the first axis that is within a type-specific time-series segment associated with a particular security event type and that corresponds to a first particular time unit within the predefined time period, wherein the first line represents a number of security events of the particular security event type that occur during the first particular time unit; the second axis comprises a first outcome time-series segment associated with a number of security events that are remediated and a second outcome time-series segment associated with a number of security events that are not remediated; each of the first outcome time-series segment and the second outcome time-series segment is associated with the predefined time period; a second line of the plurality of second lines terminates at a point along the second axis that is within the first outcome time-series segment or the second outcome time-series segment and that corresponds to a second particular time unit within the predefined time period, wherein the second line represents a number of security events for any of the plurality of security event types that are either remediated or not remediated at the second particular time unit; the first outcome time-series segment has a first display distance along the second axis associated with the number of security events that are remediated; the second outcome time-series segment has a second display distance along the second axis associated with the number of security events that are not remediated; the security report visual includes a first line graph that is positioned adjacent to the first outcome time-series segment and that indicates the number of security events that are remediated on a given particular time unit; the security report visual includes a second line graph that is positioned adjacent to the second outcome time-series segment that indicates the number of security events that are not remediated on a given particular time unit; the first line represents the number of security events of the particular security event type that occur during the first particular time unit by calculating a width for a thickness of the first line using a function of the number of security events of the particular security event type that occur during the first particular time unit; and the second line represents the number of security events for any of the plurality of security event types that are either remediated or not remediated at the second particular time unit by calculating a width for a thickness of the second line using a function of the number of security events for any of the plurality of security event types that are either remediated or not remediated at the second particular time unit; generating one or more output data files for the security report visual; and causing the security report visual to be displayed based on the one or more output data files.

Example Clause B, a method comprising: generating, by one or more processing units, a security report visual illustrating a plurality of security events that occur in a predefined time period, the security report visual comprising a first axis, a second axis that is parallel to the first axis, a graphical user interface element at a location between the first axis and the second axis, a plurality of first lines that originate along the first axis and terminate within the graphical user interface element, and a plurality of second lines that originate within the graphical user interface element and terminate along the second axis, wherein: the first axis comprises a plurality of type-specific time-series segments respectively associated with a plurality of security event types; each type-specific time-series segment of the plurality of type-specific time-series segments is associated with the predefined time period; a first line of the plurality of first lines originates at a point along the first axis that is within a type-specific time-series segment associated with a particular security event type and that corresponds to a first particular time unit within the predefined time period, wherein the first line represents a number of security events of the particular security event type that occur during the first particular time unit; the second axis comprises a first outcome time-series segment associated with a number of security events that are remediated and a second outcome time-series segment associated with a number of security events that are not remediated; each of the first outcome time-series segment and the second outcome time-series segment is associated with the predefined time period; and a second line of the plurality of second lines terminates at a point along the second axis that is within the first outcome time-series segment or the second outcome time-series segment and that corresponds to a second particular time unit within the predefined time period, wherein the second line represents a number of security events for any of the plurality of security event types that are either remediated or not remediated at the second particular time unit; generating one or more output data files for the security report visual;

and causing the security report visual to be displayed based on the one or more output data files.

Example Clause C, the method of Example Clause B, wherein the security report visual further comprises: a first line graph that is positioned adjacent to the first outcome time-series segment and that indicates the number of security events that are remediated on a given particular time unit; and a second line graph that is positioned adjacent to the second outcome time-series segment that indicates the number of security events that are not remediated on a given particular time unit.

Example Clause D, the method of Example Clause B or Example Clause C, wherein: the first outcome time-series segment has a first display distance along the second axis associated with the number of security events that are remediated; the second outcome time-series segment has a second display distance along the second axis associated with the number of security events that are not remediated; and the first outcome time-series segment and the second outcome time-series segment are separated by an intersection point.

Example Clause E, the method of Example Clause D, wherein the graphical user interface element is positioned in a direction associated with first axis and second axis based on the intersection point.

Example Clause F, the method of any one of Example Clause B through E, wherein a direction of the first axis and the second axis is selected from a group comprising: a vertical direction; or a horizontal direction.

Example Clause G, the method of any one of Example Clause B through F, further comprising: receiving input that selects a particular security event type from the plurality of security event types; and filtering the plurality of first lines such that a subset of first lines corresponding to the particular security event types selected remain in the security report visual and other subsets of first lines corresponding to other security event types not selected are removed from the security report visual.

Example Clause H, the method of any one of Example Clause B through G, wherein the first axis contains a number of potential origination points for the plurality of first lines that is determined based on a number of security event types and a number of time units within the predefined time period.

Example Clause I, the method of Example Clause H, wherein the second axis contains a number of potential termination points that is twice the number of time units within the predefined time period.

Example Clause J, the method of any one of Example Clause B through I, wherein: the first line represents the number of security events of the particular security event type that occur during the first particular time unit by calculating a width for a thickness of the first line using a function of the number of security events of the particular security event type that occur during the first particular time unit; and the second line represents the number of security events for any of the plurality of security event types that are either remediated or not remediated at the second particular time unit by calculating a width for a thickness of the second line using a function of the number of security events for any of the plurality of security event types that are either remediated or not remediated at the second particular time unit.

Example Clause K, the method of Example Clause J, wherein: the first line comprises a first spline defined by a plurality of fit points and a second spline defined by a plurality of companion fit points determined based on the width for the thickness of the first line; and the second line comprises a first spline defined by a plurality of fit points and a second spline defined by a plurality of companion fit points determined based on the width for the thickness of the second line.

Example Clause L, the method of Example Clause J or Example Clause K, wherein: the first line has a thickness at a predefined minimum width at a point of origination along the first axis; the second line has a thickness at the predefined minimum width at a point of termination along the second axis; the width for the thickness of the first line corresponds to a central point that is equidistant to the point of origination along the first axis and a point of termination within the graphical user interface element; the width for the thickness of the second line corresponds to a central point that is equidistant to the point of termination along the second axis and a point of origination within the graphical user interface element.

Example Clause M, the method of the method of any one of Example Clause J through L, wherein: the function is a combination of a linear scaling function and a logarithmic scaling function; the linear scaling function is used up to threshold number; and the logarithmic scaling function is used after the threshold number and is constrained by a maximum width.

Example Clause N, a system comprising: one or more processing units; and computer-readable storage media storing instructions that, when executed by the one or more processing units, cause the system to perform operations comprising: generating a visual illustrating a plurality of data events that occur in a predefined time period, the visual comprising a first axis, a second axis that is parallel to the first axis, a graphical user interface element at a location between the first axis and the second axis, a plurality of first lines that originate along the first axis and terminate within the graphical user interface element, and a plurality of second lines that originate within the graphical user interface element and terminate along the second axis, wherein: the first axis comprises a plurality of type-specific segments respectively associated with a plurality of data event types; each type-specific segment of the plurality of type-specific segments is associated with a predefined number of attribute units; a first line of the plurality of first lines originates at a point along the first axis that is within a type-specific segment associated with a particular data event type and that corresponds to a first particular attribute unit, wherein the first line represents a number of data events of the particular data event type that correspond to the first particular attribute unit; the second axis comprises at least a first outcome segment associated with a number of data events of a first outcome and a second outcome segment associated with a number of data events of a second outcome; and a second line of the plurality of second lines terminates at a point along the second axis that is within the first outcome segment or the second outcome segment and that corresponds to a second particular attribute unit, wherein the second line represents a number of data events for any of the plurality of data event types of the first outcome or the second outcome at the second particular attribute unit; generating one or more output data files for the security report visual; and causing the security report visual to be displayed based on the one or more output data files.

Example Clause O, the system of Example Clause N, wherein the visual further comprises: a first line graph that is positioned adjacent to the first outcome segment and that indicates the number of data events for any of the plurality of data event types of the first outcome at a given attribute unit; and a second line graph that is positioned adjacent to the second outcome segment that indicates the number of data events for any of the plurality of data event types of the second outcome at a given attribute unit.

Example Clause P, the system of Example Clause N or Example Clause O, wherein: the first outcome segment has a first display distance along the second axis associated with the number of data events of the first outcome; the second outcome segment has a second display distance along the second axis associated with the number of data events of the second outcome; and the first outcome segment and the second outcome segment are separated by an intersection point.

Example Clause Q, the system of any one of Example Clause N through P, wherein: the plurality of first lines are color coded according to the plurality of data event types; and the plurality of second lines are color coded according to the first outcome and the second outcome.

Example Clause R, the system of any one of Example Clause N through Q, wherein: the first line represents the number of data events of the particular data event type that correspond to the first particular attribute unit by calculating a width for a thickness of the first line using a function of the number of data events of the particular data event type that correspond to the first particular attribute unit; and the second line represents the number of data events for any of the plurality of data event types of the first outcome or the second outcome at the second particular attribute unit by calculating a width for a thickness of the second line using a function of the number of data events for any of the plurality of data event types of the first outcome or the second outcome at the second particular attribute unit.

Example Clause S, the system of Example Clause R, wherein: the function is a combination of a linear scaling function and a logarithmic scaling function; the linear scaling function is used up to threshold number; and the logarithmic scaling function is used after the threshold number and is constrained by a maximum width.

Example Clause T, the system of any one of Example Clause N through S, wherein a direction of the first axis and the second axis is selected from a group comprising: a vertical direction; or a horizontal direction.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

In addition, any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different axes)

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:
1. A system comprising:
one or more processing units;
computer-readable storage media storing instructions that, when executed by the one or more processing units, cause the system to perform operations comprising:
  generating a security report visual illustrating a plurality of security events that occur in a predefined time period, the security report visual comprising a first axis, a second axis that is parallel to the first axis, a graphical user interface element at a location between the first axis and the second axis, a plurality of first lines that originate along the first axis and terminate within the graphical user interface element, and a plurality of second lines that originate within the graphical user interface element and terminate along the second axis, wherein:
    the first axis comprises a plurality of type-specific time-series segments respectively associated with a plurality of security event types, wherein each of the plurality of type-specific time-series segments is an equal size to other type-specific time-series segments in the plurality of type-specific time-series segments;
    each type-specific time-series segment of the plurality of type-specific time-series segments is associated with the predefined time period;
    a first line of the plurality of first lines originates at a point along the first axis that is within a type-specific time-series segment associated with a particular security event type and that corresponds to a first particular time unit within the predefined time period, wherein the first line represents a number of security events of the particular security event type that occur during the first particular time unit;
    the second axis comprises a first outcome time-series segment associated with a number of security events that are remediated and a second outcome time-series segment associated with a number of security events that are not remediated;
    each of the first outcome time-series segment and the second outcome time-series segment is associated with the predefined time period;
    a second line of the plurality of second lines terminates at a point along the second axis that is within the first outcome time-series segment or the second outcome time-series segment and that corresponds to a second particular time unit within the predefined time period, wherein the second line represents a number of security events for any of the plurality of security event types that are either remediated or not remediated at the second particular time unit;

the first outcome time-series segment has a first display distance along the second axis associated with the number of security events that are remediated;

the second outcome time-series segment has a second display distance along the second axis associated with the number of security events that are not remediated;

the security report visual includes a first line graph that is positioned adjacent to the first outcome time-series segment and that indicates the number of security events that are remediated on a given particular time unit;

the security report visual includes a second line graph that is positioned adjacent to the second outcome time-series segment that indicates the number of security events that are not remediated on a given particular time unit;

the first line represents the number of security events of the particular security event type that occur during the first particular time unit by calculating a width for a thickness of the first line using a function of the number of security events of the particular security event type that occur during the first particular time unit; and the second line represents the number of security events for any of the plurality of security event types that are either remediated or not remediated at the second particular time unit by calculating a width for a thickness of the second line using a function of the number of security events for any of the plurality of security event types that are either remediated or not remediated at the second particular time unit;

generating one or more output data files for the security report visual; and causing the security report visual to be displayed based on the one or more output data files.

2. A method comprising:

generating, by one or more processing units, a security report visual illustrating a plurality of security events that occur in a predefined time period, the security report visual comprising a first axis, a second axis that is parallel to the first axis, a graphical user interface element at a location between the first axis and the second axis, a plurality of first lines that originate along the first axis and terminate within the graphical user interface element, and a plurality of second lines that originate within the graphical user interface element and terminate along the second axis, wherein:

the first axis comprises a plurality of type-specific time-series segments respectively associated with a plurality of security event types;

each type-specific time-series segment of the plurality of type-specific time-series segments is associated with the predefined time period;

a first line of the plurality of first lines originates at a point along the first axis that is within a type-specific time-series segment associated with a particular security event type and that corresponds to a first particular time unit within the predefined time period, wherein the first line represents a number of security events of the particular security event type that occur during the first particular time unit;

the second axis comprises a first outcome time-series segment associated with a number of security events that are remediated and a second outcome time-series segment associated with a number of security events that are not remediated;

each of the first outcome time-series segment and the second outcome time-series segment is associated with the predefined time period; and a second line of the plurality of second lines terminates at a point along the second axis that is within the first outcome time-series segment or the second outcome time-series segment and that corresponds to a second particular time unit within the predefined time period, wherein the second line represents a number of security events for any of the plurality of security event types that are either remediated or not remediated at the second particular time unit;

generating one or more output data files for the security report visual; and causing the security report visual to be displayed based on the one or more output data files.

3. The method of claim 2, wherein the security report visual further comprises:

a first line graph that is positioned adjacent to the first outcome time-series segment and that indicates the number of security events that are remediated on a given particular time unit; and a second line graph that is positioned adjacent to the second outcome time-series segment that indicates the number of security events that are not remediated on a given particular time unit.

4. The method of claim 2, wherein:

the first outcome time-series segment has a first display distance along the second axis associated with the number of security events that are remediated;

the second outcome time-series segment has a second display distance along the second axis associated with the number of security events that are not remediated; and the first outcome time-series segment and the second outcome time-series segment are separated by an intersection point.

5. The method of claim 4, wherein the graphical user interface element is positioned in a direction associated with first axis and second axis based on the intersection point.

6. The method of claim 2, wherein a direction of the first axis and the second axis is selected from a group comprising:

a vertical direction; or a horizontal direction.

7. The method of claim 2, further comprising:

receiving input that selects a particular security event type from the plurality of security event types; and filtering the plurality of first lines such that a subset of first lines corresponding to the particular security event types selected remain in the security report visual and other subsets of first lines corresponding to other security event types not selected are removed from the security report visual.

8. The method of claim 2, wherein the first axis contains a number of potential origination points for the plurality of first lines that is determined based on a number of security event types and a number of time units within the predefined time period.

9. The method of claim 8, wherein the second axis contains a number of potential termination points that is twice the number of time units within the predefined time period.

10. The method of claim 2, wherein:
the first line represents the number of security events of the particular security event type that occur during the first particular time unit by calculating a width for a thickness of the first line using a function of the number of security events of the particular security event type that occur during the first particular time unit; and
the second line represents the number of security events for any of the plurality of security event types that are either remediated or not remediated at the second particular time unit by calculating a width for a thickness of the second line using a function of the number of security events for any of the plurality of security event types that are either remediated or not remediated at the second particular time unit.

11. The method of claim 10, wherein:
the first line comprises a first spline defined by a plurality of fit points and a second spline defined by a plurality of companion fit points determined based on the width for the thickness of the first line; and
the second line comprises a first spline defined by a plurality of fit points and a second spline defined by a plurality of companion fit points determined based on the width for the thickness of the second line.

12. The method of claim 10, wherein:
the first line has a thickness at a predefined minimum width at a point of origination along the first axis;
the second line has a thickness at the predefined minimum width at a point of termination along the second axis;
the width for the thickness of the first line corresponds to a central point that is equidistant to the point of origination along the first axis and a point of termination within the graphical user interface element;
the width for the thickness of the second line corresponds to a central point that is equidistant to the point of termination along the second axis and a point of origination within the graphical user interface element.

13. The method of claim 10, wherein:
the function is a combination of a linear scaling function and a logarithmic scaling function;
the linear scaling function is used up to threshold number; and
the logarithmic scaling function is used after the threshold number and is constrained by a maximum width.

14. A system comprising:
one or more processing units; and
computer-readable storage media storing instructions that, when executed by the one or more processing units, cause the system to perform operations comprising:
generating a visual illustrating a plurality of data events that occur in a predefined time period, the visual comprising a first axis, a second axis that is parallel to the first axis, a graphical user interface element at a location between the first axis and the second axis, a plurality of first lines that originate along the first axis and terminate within the graphical user interface element, and a plurality of second lines that originate within the graphical user interface element and terminate along the second axis, wherein:
the first axis comprises a plurality of type-specific segments respectively associated with a plurality of data event types;
each type-specific segment of the plurality of type-specific segments is associated with a predefined number of attribute units;
a first line of the plurality of first lines originates at a point along the first axis that is within a type-specific segment associated with a particular data event type and that corresponds to a first particular attribute unit, wherein the first line represents a number of data events of the particular data event type that correspond to the first particular attribute unit;
the second axis comprises at least a first outcome segment associated with a number of data events of a first outcome and a second outcome segment associated with a number of data events of a second outcome; and
a second line of the plurality of second lines terminates at a point along the second axis that is within the first outcome segment or the second outcome segment and that corresponds to a second particular attribute unit, wherein the second line represents a number of data events for any of the plurality of data event types of the first outcome or the second outcome at the second particular attribute unit;
generating one or more output data files for the security report visual; and
causing the security report visual to be displayed based on the one or more output data files.

15. The system of claim 14, wherein the visual further comprises:
a first line graph that is positioned adjacent to the first outcome segment and that indicates the number of data events for any of the plurality of data event types of the first outcome at a given attribute unit; and
a second line graph that is positioned adjacent to the second outcome segment that indicates the number of data events for any of the plurality of data event types of the second outcome at a given attribute unit.

16. The system of claim 14, wherein:
the first outcome segment has a first display distance along the second axis associated with the number of data events of the first outcome;
the second outcome segment has a second display distance along the second axis associated with the number of data events of the second outcome; and
the first outcome segment and the second outcome segment are separated by an intersection point.

17. The system of claim 14, wherein:
the plurality of first lines are color coded according to the plurality of data event types; and
the plurality of second lines are color coded according to the first outcome and the second outcome.

18. The system of claim 14, wherein:
the first line represents the number of data events of the particular data event type that correspond to the first particular attribute unit by calculating a width for a thickness of the first line using a function of the number of data events of the particular data event type that correspond to the first particular attribute unit; and
the second line represents the number of data events for any of the plurality of data event types of the first outcome or the second outcome at the second particular attribute unit by calculating a width for a thickness of the second line using a function of the number of data events for any of the plurality of data event types of the first outcome or the second outcome at the second particular attribute unit.

19. The system of claim 18, wherein:

the function is a combination of a linear scaling function and a logarithmic scaling function;

the linear scaling function is used up to threshold number; and the logarithmic scaling function is used after the threshold number and is constrained by a maximum width.

20. The system of claim 14, wherein a direction of the first axis and the second axis is selected from a group comprising:

a vertical direction; or a horizontal direction.

* * * * *